United States Patent [19]

Fulks et al.

[11] Patent Number: 5,431,431
[45] Date of Patent: Jul. 11, 1995

[54] VEHICLE ROLL CONTROL SYSTEM

[75] Inventors: Gary C. Fulks, Paris, France;
Nicholas Jones, Northamptonshire, United Kingdom; Phillippe Germain, Levallois-Perret, France

[73] Assignee: ACG France, Gennevilliers, France

[21] Appl. No.: 288,092

[22] Filed: Aug. 9, 1994

[30] Foreign Application Priority Data

Nov. 30, 1993 [GB] United Kingdom ............... 9324551

[51] Int. Cl.6 ............................................ B60G 11/18
[52] U.S. Cl. ................................ 280/721; 280/723; 280/689; 267/277
[58] Field of Search ............. 280/721, 723, 695, 700, 280/689, 772; 267/191, 277

[56] References Cited

U.S. PATENT DOCUMENTS

| | | |
|---|---|---|
| 4,140,333 | 2/1979 | Thoraval et al. ............ 280/721 X |
| 4,265,467 | 5/1981 | Aleck ........................... 280/721 |
| 4,796,911 | 1/1989 | Kuroki et al. ................. 280/689 |
| 5,128,406 | 1/1993 | Reynolds ...................... 280/723 |
| 5,186,486 | 2/1993 | Hynds et al. .................. 280/689 |
| 5,217,245 | 6/1993 | Guy ............................... 280/689 |
| 5,288,101 | 2/1994 | Minnett .......................... 280/689 |

FOREIGN PATENT DOCUMENTS

| | | |
|---|---|---|
| 0512358 | 4/1992 | European Pat. Off. . |
| 3176713 | 7/1988 | Japan ............................ 280/689 |
| 2006131 | 5/1974 | United Kingdom ......... 280/689 |
| 2230237 | 10/1990 | United Kingdom ......... 280/723 |

*Primary Examiner*—Margaret A. Focarino
*Assistant Examiner*—Christopher P. Ellis
*Attorney, Agent, or Firm*—Anthony Luke Simon

[57] ABSTRACT

A vehicle roll control system (22,24) for a vehicle (10) having a pair of wheels (12,16) each rotatable on an axle (14,18), comprising a torsion bar (26); a first arm (28) extending substantially perpendicular to the torsion bar, the first arm being fixed to the torsion bar at one end and being connectable to one of the axles at the other end; a second arm (30) extending substantially perpendicular to the torsion bar, the second arm being rotatably mounted on the torsion bar at one end and being connectable to the other axle at the other end; and an actuation (32,34) connected between the second arm and the torsion bar, the actuation being actuable on detection of a predetermined vehicle condition to substantially prevent or allow rotation of the second arm relative to the torsion bar.

3 Claims, 4 Drawing Sheets

VEHICLE ROLL CONTROL SYSTEM

The present invention relates to a roll control system for a motor vehicle.

SUMMARY OF THE INVENTION

The aim of the present invention is to provide a roll control system which is only active when one or more monitored vehicle conditions indicates roll control is required.

To this end, a vehicle roll control system in accordance with the present invention is provided for a vehicle having a pair of wheels each rotatable on an axle.. The roll control system comprises a torsion bar with a first arm extending substantially perpendicular to the torsion bar. The first arm is fixed to the torsion bar at one end and is connectable to one of the axles at the other end. A second arm extends substantially perpendicular to the torsion bar. The second arm is rotatably mounted on the torsion bar at one end and is connectable to the other axle at the other end. A rotation control means is connected between the second arm and the torsion bar and is actuable on detection of a predetermined vehicle condition to substantially prevent or allow rotation of the second arm relative to the torsion bar.

BRIEF DESCRIPTION OF THE DRAWINGS

The present invention will now be described by way of example, with reference to the accompanying drawings, in which.

DESCRIPTION OF THE PREFERRED EMBODIMENTS

Figure 1:
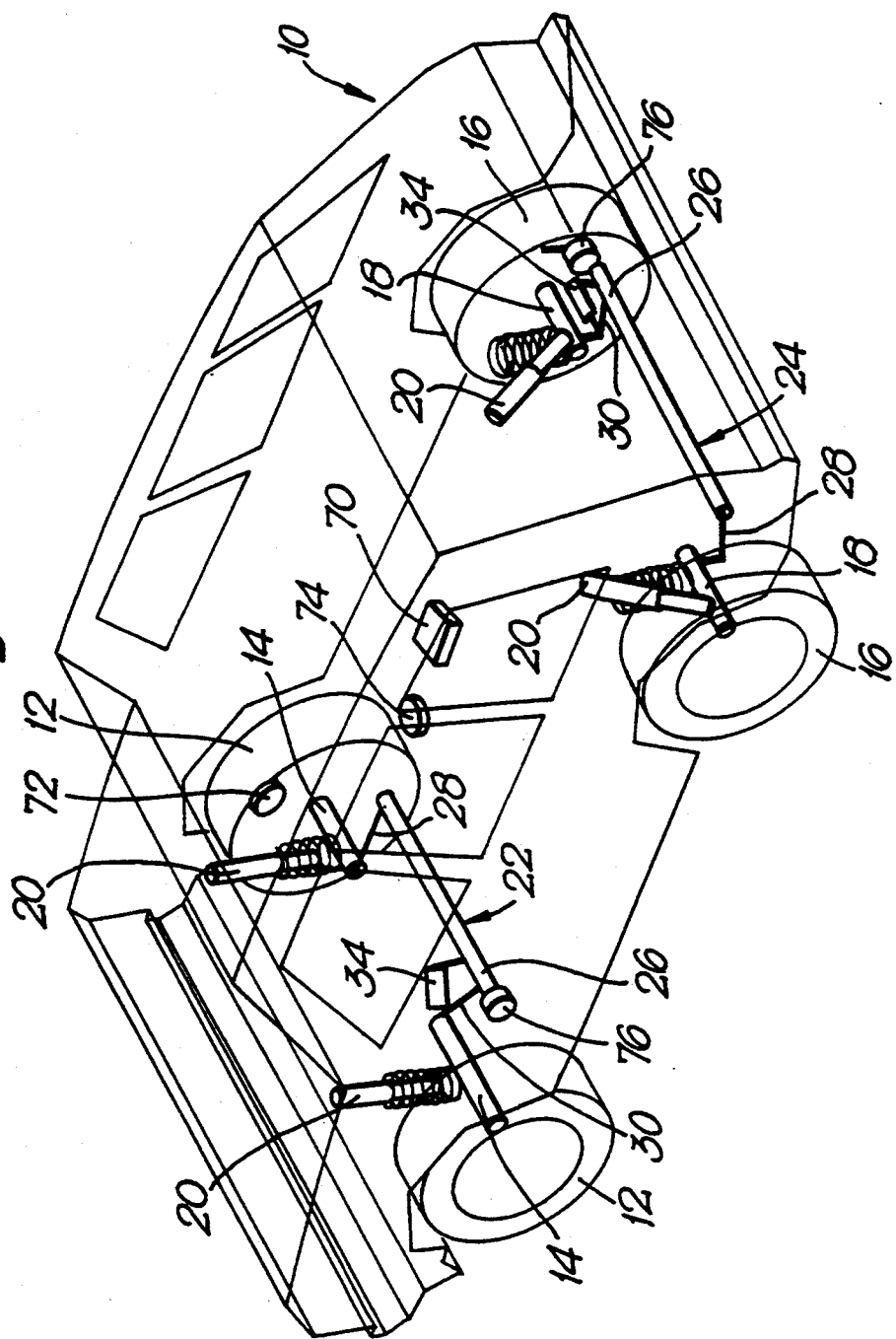
FIG. 1 is a schematic presentation of a vehicle incorporating a vehicle roll control system in accordance with the present invention at the front and at the rear of the vehicle.

Referring to FIG. 1, a vehicle 10 is shown schematically and comprises a pair of front wheels 12 each rotatably mounted on a pair of axles 14, a pair of rear wheels 16 each rotatably mounted on a pair of axles 18, and a shocking absorbing system 20 associated with each wheel. A vehicle roll control system 22 in accordance with the present invention is associated with the front wheels 12, and a vehicle roll control system 24 in accordance with the present invention is associated with the rear wheels 16. The vehicle roll control systems 22, 24 are substantially the same but with modifications made solely to allow fitting to the vehicle 10.

Referring in more detail to FIGS. 2 to 5, the vehicle roll control system 22 for the front of the vehicle comprises a torsion bar 26, a first arm 28, a second arm 30, a lever arm 32, and a hydraulic actuator 34. The torsion bar 26 is mounted on the vehicle by a pair of resilient mounts 36 in conventional manner to extend longitudinally between the wheels 12. The first arm 28 (FIG. 3) is fixed at one end 38 by a splined connection 40 to the torsion bar 26. The other end 42 of the first arm 28 is connected to the axle 14 of one of the front wheels 12. The second arm 30 (FIG. 4) is rotatably mounted at one end 44 on the torsion bar 26 by way of a bearing 46. The other end 48 of the second arm 30 is connected to the axle 14 of the other front wheel 12. The first and second arms 28,30 extend substantially parallel to one another when the vehicle is stationary, and substantially perpendicular to the torsion bar 26.

Figure 4:
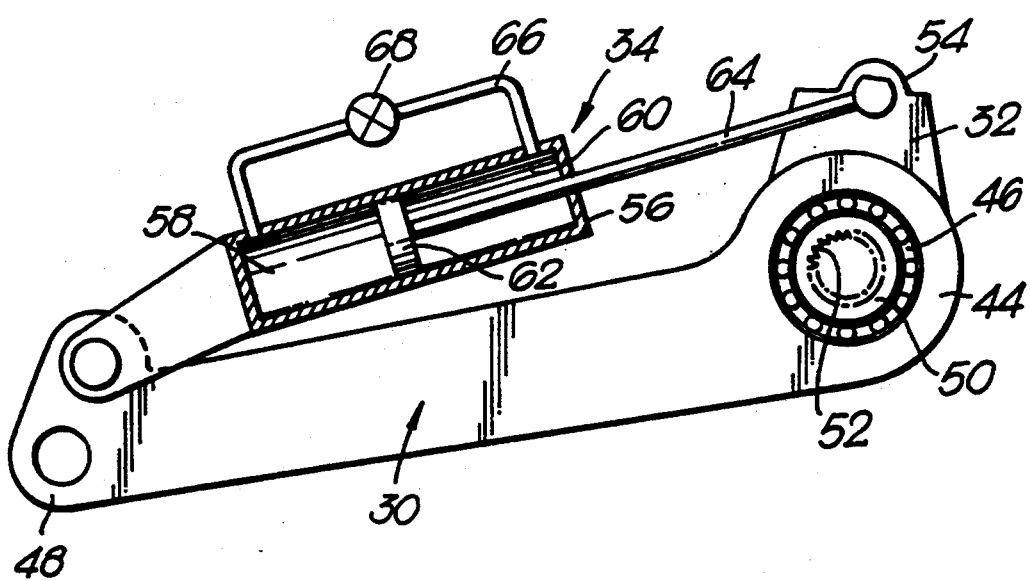
FIG. 4 is a side view of the second arm, hydraulic actuator (shown in cross-section) and lever arm of the vehicle roll control system shown in FIG. 2.
Figure 5:
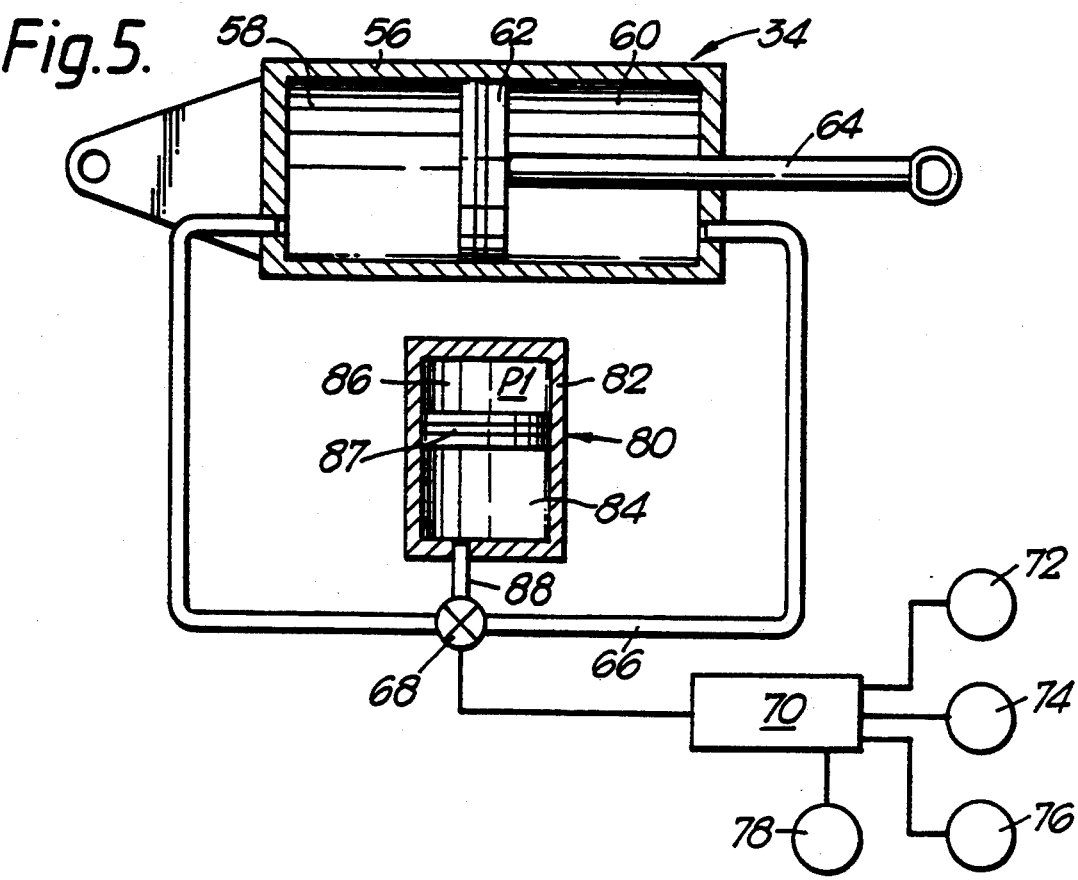
FIG. 5 is a schematic diagram of part of the hydraulic and electrical control circuit of the vehicle roll control system shown in FIG. 2.

The lever arm 32 (FIG. 4) is fixed at one end 50 to the torsion bar 26 by a splined connection 52 substantially adjacent the one end 44 of the second arm 30 and the bearing 46. The lever arm 32 extends substantially perpendicular to the torsion bar 26 to a free end 54. The hydraulic actuator 34 (FIG. 4) extends between, and is connected to, the free end 54 of the lever arm 32 and the other end 48 of the second arm 30. The hydraulic actuator 34 comprises a housing 56 which defines a pair of fluid chambers 58,60 separated by a piston 62 which makes a sealing sliding fit with the housing. As shown in FIG. 4, the housing 56 is connected to the other end 48 of the second arm 30, and the piston 62 is connected to the free end 54 of the lever arm 34 by a piston rod 64. It will be appreciated that these connections may be reversed. The fluid chambers 58,60 are fluidly connectable to each other by a fluid line 66. A solenoid operated valve 68 is positioned in the fluid line 66, the valve being biased to a normally closed position. A fluid reservoir 80 supplies hydraulic fluid to the fluid chambers 58,60. The fluid reservoir 80 (FIG. 5) comprises a housing 82 defining a pair of fluid chambers 84,86 separated by a piston 87 which makes a sealing sliding fit with the housing 82. One 86 of the fluid chambers is closed. The other fluid chamber 84 is fluidly connectable to the fluid line 66 by way of a fluid line 88 and the valve 68. The operation of the valve 68 is controlled by an electronic and/or computerised control module 70 (FIG. 5). The control module 70 operates the valve 68 to open the valve dependent on predetermined vehicle conditions which are determined by signals from a steering sensor 72 (which monitors the steering angle of the front wheels 12) and/or a lateral g sensor 74 (which monitors the sideways acceleration of the vehicle). The control module 70 may also take into account signals received from a rotary displacement sensor 76 (which monitors the angle of displacement between the torsion bar 26 and the second arm 30) and/or a vehicle speed sensor 78 and/or any other relevant parameter to determine the required state of operation of the valve 68.

If the control module 70 detects that roll control is not required, the control module sends a signal to the solenoid operated valve 68 to open the valve. Fluid can freely flow between the two fluid chambers 58,60, allowing movement of the piston 62 relative to the housing 56, thereby allowing rotation of the second-arm 30 relative to the torsion bar 26. The load acting on the second arm 30 is defined by the piston rod 64 displacement acting on the pressure P1 in the closed fluid chamber 86 of the fluid reservoir 80. If the control module 70 detects that roll control is required, the control module sends a signal to the solenoid operated valve 68 to close the valve. This action substantially prevents flow of fluid between the fluid chambers 58,60 to substantially lock the piston 62 relative to the housing 56, thereby substantially locking the second arm 30 relative to the torsion bar 26 and providing roll control for the vehicle 10.

Figure 6:
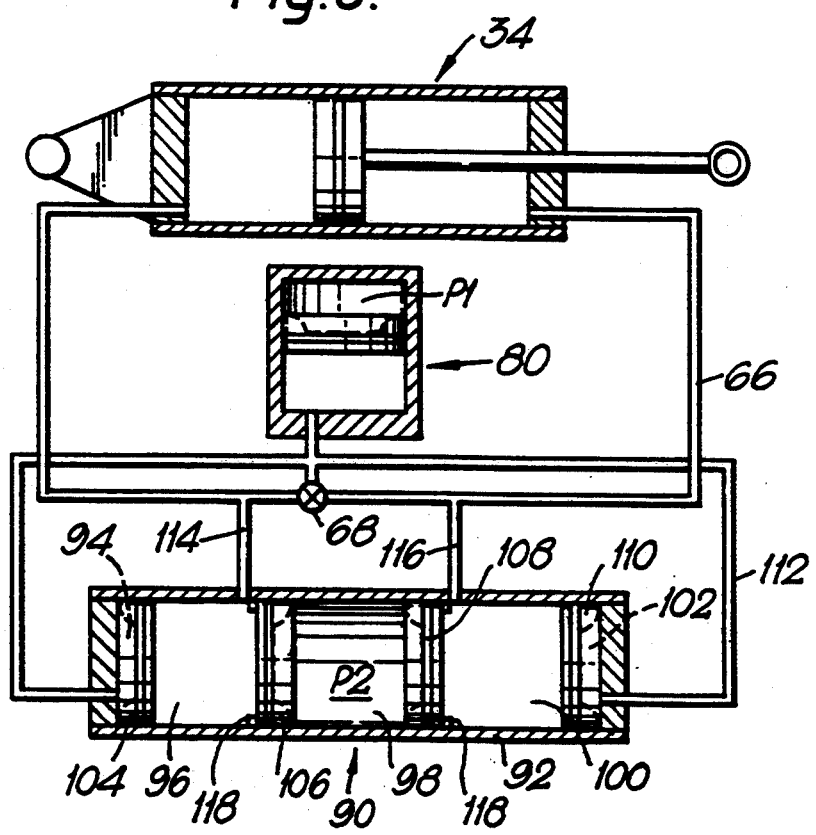
FIG. 6 is a schematic diagram of a variation of the hydraulic control circuit shown in FIG. 5.

A modification of the hydraulic circuit of FIG. 5 is shown in FIG. 6. In this modification, a hydraulic accumulator 90 is incorporated into the hydraulic circuit. The accumulator 90 acts as an overload protector to prevent damage to the hydraulic components of the vehicle roll control system 22,24 should there be a sudden increase in fluid pressure in one of the fluid chambers 58,60 in the hydraulic actuator 34 (which could occur, for example, if a wheel 12,16 strikes a large stone or similar object) whilst the valve 68 is closed. The accumulator 90 comprises a housing 92 which is divided into five fluid chambers 94,96,98,100,102 by four pistons 104,106,108,110 which make a sealing sliding fit in the housing 92. The two fluid chambers 94,102 at the extreme ends of the housing 92 are fluidly connected to each other and to the other fluid chamber 84 of the fluid reservoir 80 by a fluid line 112 and fluid line 88. The next adjacent fluid chambers 96,100 are connected by fluid lines 114,116 to the fluid line 66 on opposite sides of the solenoid operated valve 68. The centrally positioned fluid chamber 98 is closed. Stops 118 in the housing 92 restrict movement of the centrally positioned pistons 106,108 to define the maximum size of the central fluid chamber 98 and to prevent the pistons 106,108 closing the fluid lines 114,116. A surge in fluid pressure in either of the fluid chambers 58,60 in the hydraulic actuator 34 (whilst the solenoid operated valve 68 is closed) will increase the fluid pressure in the connected fluid chamber 96,100 in the accumulator 90 to move piston 106 or piston 108 against the pressure P2 in the central fluid chamber 98. This arrangements provides damping to the pressure surge, thereby substantially preventing damage to the hydraulic actuator 34 or the solenoid operated valve 68.

Figure 2:
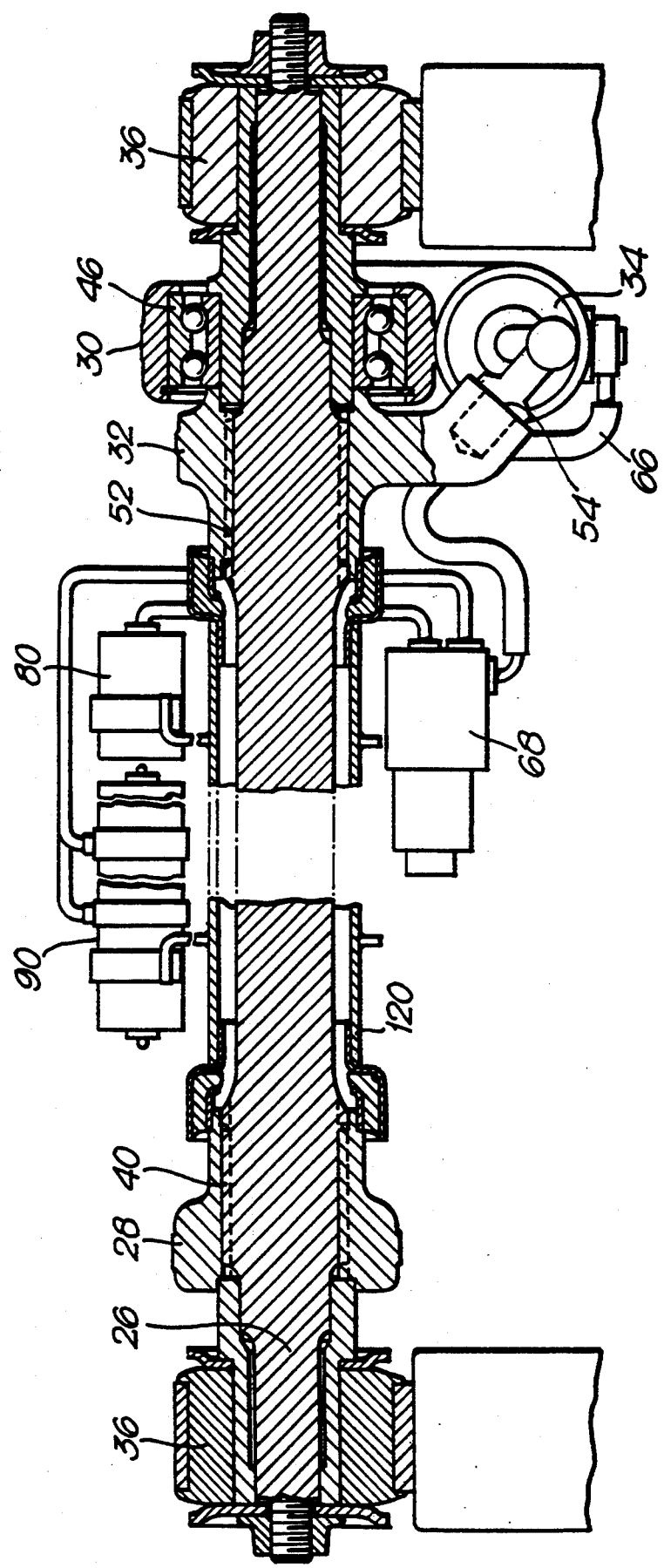
FIG. 2 is a side view of the vehicle roll control system at the front of the vehicle shown in FIG. 1.
Figure 3:
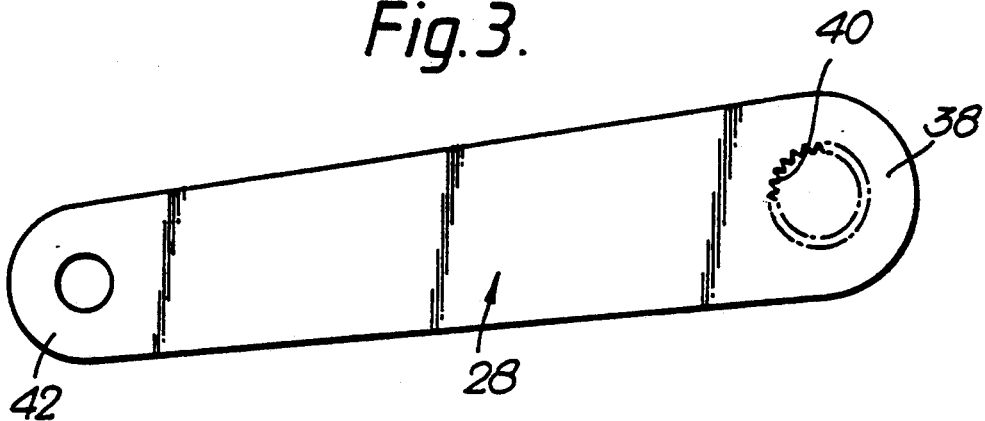
FIG. 3 is a side view of the first arm of the vehicle roll control system shown in FIG. 2.

As shown in FIG. 2, a carrier tube 120 may be mounted on the torsion bar 26. The solenoid operated valve 68 may be mounted on the carrier tube 120 along with associated components such as the fluid reservoir 80 and the accumulator 90, with the fluid line 66 to the hydraulic actuator 34 being flexible. This arrangement allows the vehicle roll control system 22 to be assembled as a separate module (with the exception of the control module 70 and associated sensors 72–78) for subsequent attachment to the vehicle 10. The carrier tube 120 also provides protection for the torsion bar 26. The same control module 70 can be used for both front and rear vehicle roll control systems 22,24 and thereby provide associated roll control for the front and the rear of the vehicle 10. The solenoid operated valve 68 may be biased to be normally open, but closable when actuated by the control module 70 on detection of the predetermined vehicle conditions. Other forms of valve may be used beside a solenoid operated valve.

We claim:

1. A vehicle roll control system for a vehicle having at least one pair of axles and at least one pair of wheels, one of the at least one pair of wheels rotatable on one of the at least one pair of axles and the other of the at least one pair of wheels rotatable on the other of the at least one pair of axles, comprising: a torsion bar; a first arm extending substantially perpendicular to the torsion bar, the first arm being fixed to the torsion bar at one end and being connectable to one of the at least one pair of axles at the other end; a second arm extending substantially perpendicular to the torsion bar, the second arm being rotatably mounted on the torsion bar at one end and being connectable to the other of the at least one pair of axles at the other end; and rotation control means connected between the second arm and the torsion bar, the rotation control means being actuable on detection of a predetermined vehicle condition to substantially prevent or allow rotation of the second arm relative to the torsion bar.

2. A vehicle roll control system as claimed in claim 1, wherein the rotation control means comprises a lever arm extending substantially perpendicular to the torsion bar, the lever arm being fixed to the torsion bar at one end adjacent said one end of the second arm, and having a free end at the other end thereof; a hydraulic actuator extending between the second arm and the lever arm, and comprising a housing connected to the second arm and defining a pair of fluid chambers separated by a piston connected to the lever arm; and a valve controlling flow of fluid between the two fluid chambers, the valve being closable on detection of the predetermined condition to prevent flow of fluid, thereby substantially locking the piston relative to the housing to substantially prevent rotation of the second arm relative to the torsion bar.

3. A vehicle roll control system as claimed in claim 1, wherein the rotation control means comprises a lever arm extending substantially perpendicular to the torsion bar, the lever arm being fixed to the torsion bar at one end adjacent said one end of the second arm, and having a free end at the other end thereof; a hydraulic actuator extending between the second arm and the lever arm, and comprising a housing connected to the lever arm and defining a pair of fluid chambers separated by a piston connected to the second arm; and a valve controlling flow of fluid between the two fluid chambers, the valve being closable on detection of the predetermined condition to prevent flow of fluid, thereby substantially locking the piston relative to the housing to substantially prevent rotation of the second arm relative to the torsion bar.

* * * * *